UNITED STATES PATENT OFFICE.

DECIUS W. CLARK, OF PHILADELPHIA, PENNSYLVANIA.

IMPROVEMENT IN ENAMELING BRICKS.

Specification forming part of Letters Patent No. 152,213, dated June 23, 1874; Reissue No. 8,995, dated December 16, 1879; application filed November 8, 1879.

*To all whom it may concern:*

Be it known that I, DECIUS W. CLARK, formerly of Chicago, in the county of Cook and State of Illinois, but now of Philadelphia, in the State of Pennsylvania, have invented a new and useful Improvement in Enameled Bricks; and I do hereby declare that the following is a full, clear, and exact description thereof.

My improvement relates to a new article of manufacture—viz., a building-brick having an enameled surface or surfaces of any desired color; and my invention consists in such brick and in the compound employed for enameling such brick.

To enable others skilled in the art to make and use my new article of manufacture, I will proceed to describe more fully its construction and the enameling compound used in its construction.

In preparing the enameling compound I take about one hundred and fifty parts of fluorspar, about sixty parts of Paris white, about fifty parts of lime, about fifty parts of oxide of tin or its equivalent, and about fifty parts of kaolin. These ingredients I pulverize and triturate to an impalpable powder, reducing the whole to a homogeneous mass, which I place in a crucible or other suitable vessel and calcine it. After this calcined mass is cooled off it is again reduced to a powder by the pulverizing process. Sufficient water is then added, and the whole triturated, so that it will form an enameling compound of about the consistency of cream. In this compound I immerse that portion of the brick I desire to enamel, and then subject it to a heat of sufficient temperature to fuse the enameling material on its surface.

When it is desired to make a brick having a black enameled surface, I add the black oxide of cobalt, black oxide of manganese, and umber to the hereinbefore-named ingredients prior to the pulverizing and calcining process. For a blue enameled surface, the black oxide of cobalt is used in like manner. For a green enameled surface, suboxide of copper is used. For a red enameled surface, suboxide of copper and red oxide of iron are used. For drab enameled surface, mineral paint known as the "Brandon mineral paint," manufactured at Brandon, in the State of Vermont. For bronze marble, carmine, and other shades and tints formed by a combination of the above, the ingredients are pulverized and formed into a homogeneous mass, and a suitable quantity of it is added to the ingredients forming the enameling compound to produce the shade or tint desired.

With this enameling compound hereinbefore described the surface of the ordinary red building-brick may be enameled and any desired shade or tint given to the enameled surface—a result not successfully accomplished prior to the date of my invention. I am enabled, therefore, to produce, at a comparatively low cost, building-brick having an enameled and ornamental surface which is unaffected by the action of heat, frost, or other atmospheric conditions.

The ordinary red building-brick herein named is made of any of the clays commonly used in the manufacture of such brick, and burned in the usual manner.

The surface of the brick to be enameled should be smooth. To this end they should preferably be pressed.

It being obvious that the enameled brick will only be used for forming fronts and other parts of the building requiring a fine finish and ornamentation, brick having a rough uneven surface, or porous, will not answer, for the enameled surface will be uneven in one case and full of small indentations in the other case.

I wish it clearly understood that in this application I do not mean to claim, broadly, the idea of enameling bricks, for modes of enameling bricks have been described by myself, as well as by others, in Letters Patent of earlier date than June 23, 1874, all of which patents, however, describe a method of enameling bricks essentially different from that described in this specification in this respect particularly—viz., in the proportions of the various materials used for the white and the colored compounds, all of which materials and compounds I have found from large experiment and use to be essential to the production of a merchantable enameled brick.

Having thus described my improvement, what I claim as my invention is—

1. The enameling compound composed of the materials, in the proportions, and mixed and prepared, all substantially as described.

2. As a new article of manufacture, a building-brick with one or more surfaces enameled with the compound composed of the materials and in the proportions substantially as described, and applied and permanently fixed to the surface or surfaces of the brick, substantially as set forth.

DECIUS W. CLARK.

Witnesses:
R. N. DYER,
JAS. A. PAYNE.